United States Patent [19]

Hartsog

[11] 4,349,011
[45] Sep. 14, 1982

[54] SOLAR OPERATED SHUTTER

[76] Inventor: Clarence E. Hartsog, 570 S. 9th St., Modesto, Calif. 95351

[21] Appl. No.: 266,250

[22] Filed: May 22, 1981

[51] Int. Cl.³ .................. F24J 3/02; E05F 15/20; F02L 5/00
[52] U.S. Cl. .................................. 126/419; 49/2; 49/31; 60/530
[58] Field of Search ......... 126/424, 419, 450, DIG. 1; 49/2, 23, 31; 160/88, 6; 353/3; 60/530, 531, 675

[56] References Cited

U.S. PATENT DOCUMENTS 3,884,414 5/1975 Baer ........................................ 49/2
4,185,615 1/1980 Bottum ................................ 126/424

Primary Examiner—Samuel Scott
Assistant Examiner—G. Anderson
Attorney, Agent, or Firm—Townsend and Townsend

[57] ABSTRACT

A solar shutter system including a pair of insulating panels pivotally mounted adjacent a glazed opening. Insulated and uninsulated counterbalance pressure tanks are mounted at opposite ends of one of the panels. The counterbalance tanks are interconnected by tubing and contain a partially vaporized fluid, such as Freon. The uninsulated tank, exposed to the sunlight, heats up during the day forcing liquid Freon from the uninsulated tank into the insulated tank to pivot the panels away from the opening. A solar collection tank beneath the glazed opening absorbs the radiant energy passing through the opening. During normal daylight hours the temperature within the uninsulated tank is greater than the temperatures in the insulated tank so that the panels remain open. When the sun sets, the temperature within the uninsulated tank drops more quickly than the temperature within the insulated tank so that liquid Freon within the insulated tnak flows back into the uninsulated tank shifting the balance of the panel to pivot the panel back down over the opening. Loss of heat from the solar collection tank is reduced.

11 Claims, 7 Drawing Figures

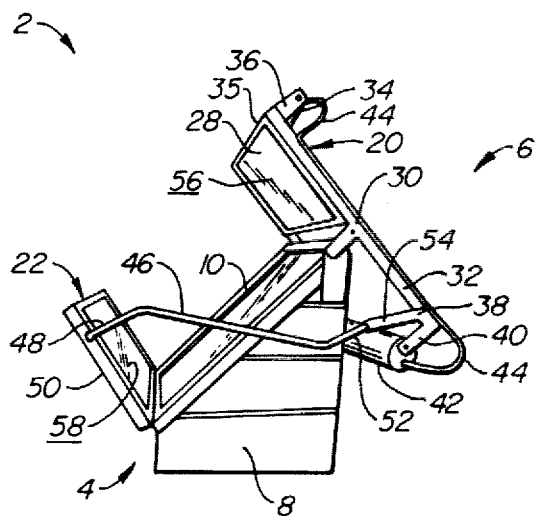
FIG._1.
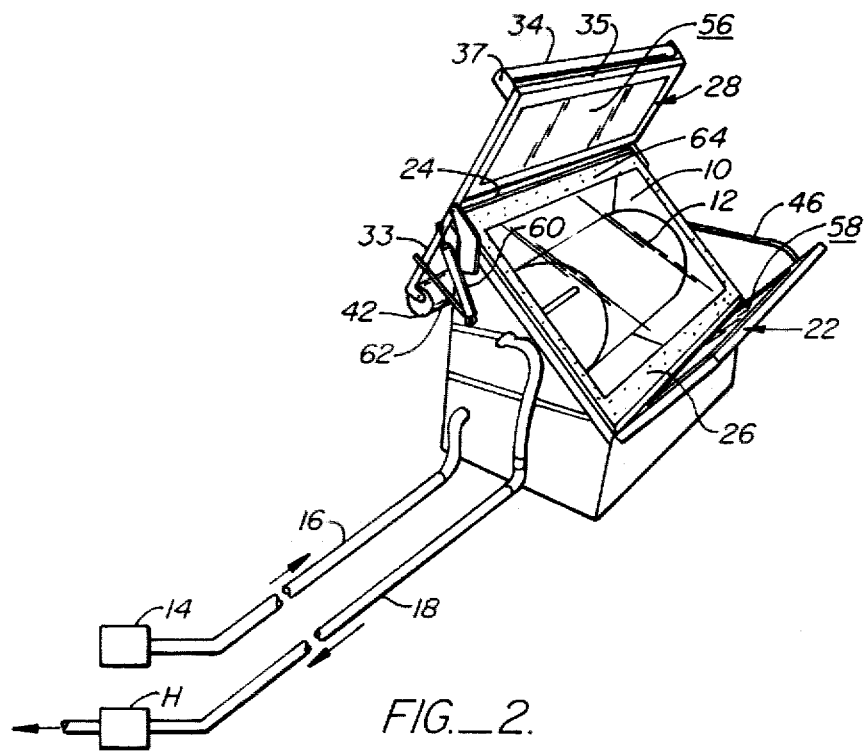
FIG._2.

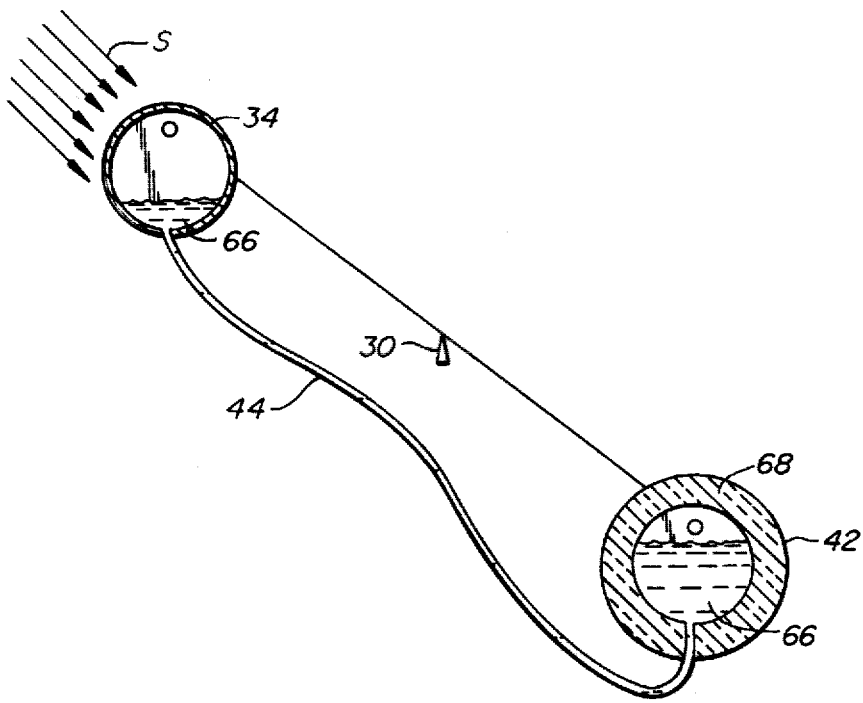
FIG.__3A.
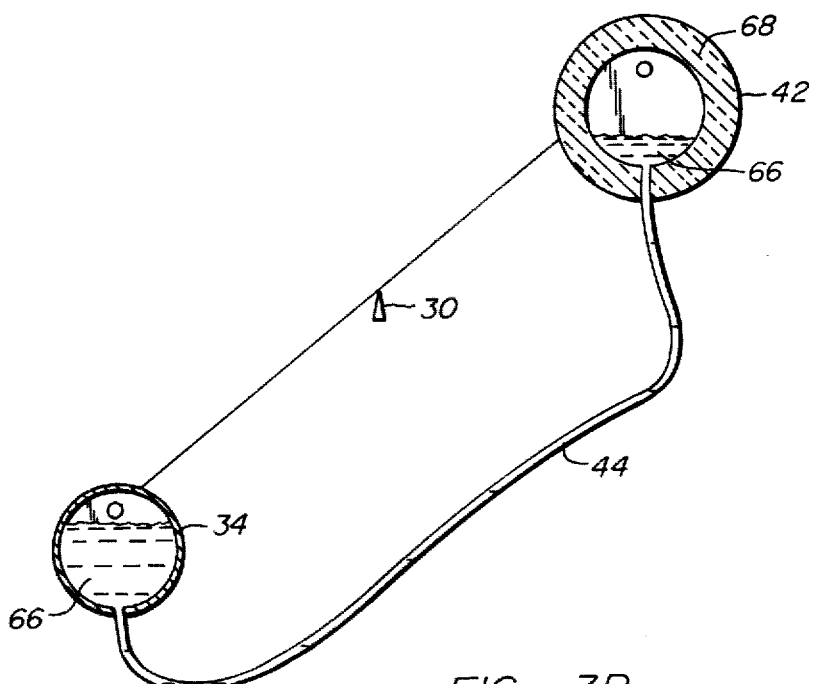
FIG.__3B.

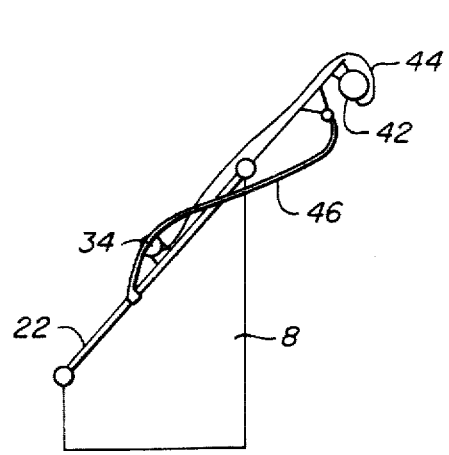
FIG._4.
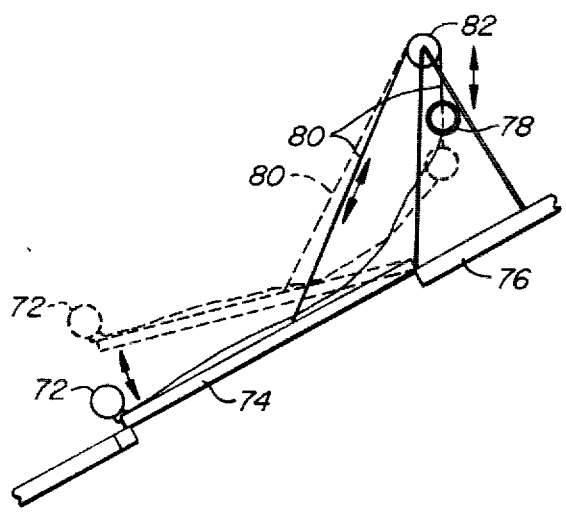
FIG._5.
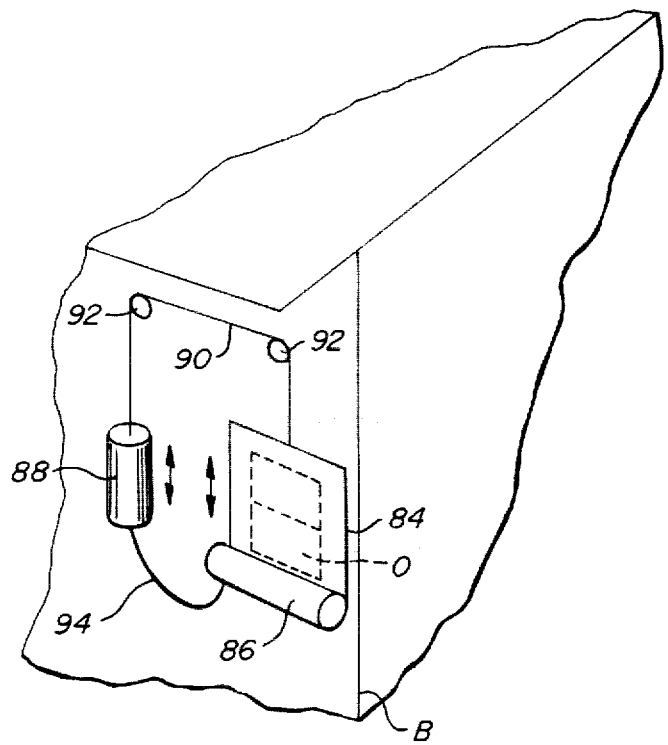
FIG._6.

SOLAR OPERATED SHUTTER

BACKGROUND OF THE INVENTION

Due to irreversibly increasing energy costs, there has been renewed interest in using the energy of the sun to heat water. Although hot water for a great number of homes in the United States was heated by the sun during the early part of this century, the availability of relatively cheap energy, particularly natural gas, caused a movement away from solar heating and toward the use of fossil fuels to heat the water.

Solar water heaters all use some type of solar collector in which sunlight strikes a dark colored material which absorbs the radiant energy and transfers the absorbed heat to a container of water. One type of collector, known as a flat plate collector, includes a number of small tubes or flat sheets housed within an insulated box having an opening covered by one or more layers of transparent glass or plastic.

Another type, known as a batch heater, uses a relatively large water tank, such as 40 to 100 gallons, housed within a well-insulated box having a glazed opening. The box is placed facing south and at an angle to the horizontal. The tank is usually painted flat black. An inlet to the tank supplies the tank with cold water from a municipal water system or well. An outlet, connected to an upper portion of the tank, is commonly connected to the inlet of a standard hot water heater. Thus, before the water passes through the hot water heater in the home, it is heated within the batch heater thus reducing, and sometimes eliminating, the energy required to raise its temperature within the standard hot water heater.

In order to reduce heat losses from the collection tank of a batch-type collector at night, the insulated box is usually supplied with a pair of insulating panels or doors; the user opens the panels during the day to expose the glazed opening to sunlight and closes them at night to cover the glazed opening. Although it may take only a minute or two each morning and evening, it still requires the user to go out of doors to open and close the panels. Often energy from early morning sunlight is lost because the shutters are not opened soon enough. If the insulating panels are not closed in the evening, a significant amount of the heat stored within the tank is lost to the cool or cold evening and night air.

SUMMARY OF THE INVENTION

A solar shutter system is disclosed including a pair of insulating panels pivotally mounted adjacent a glazed opening in a batch type solar water heater. The panels are sized to completely cover the opening at night and are pivoted away from the opening to expose the opening to sunlight during the day. A pair of counterweight pressure tanks are mounted on opposite ends of one insulating panel on either side of the pivot axis of the panel. The two panels are coupled by a tie rod so opening or closing one causes like movement in the other. The pressure tanks are interconnected by tubing and contain a partially vaporized fluid, such as Freon.

The tank that is at the lower elevation when the panels cover the opening is uninsulated and preferably is painted a dark color for high absorptivity while the other tank is thermally insulated. The uninsulated tank, exposed to the sunlight, thus heats up during the day so that the pressure within the uninsulated tank is higher than that within the insulated tank. This forces liquid from the uninsulated tank into the insulated tank until a pressure equilibrium is achieved. The transfer of liquid reduces the weight of the uninsulated tank and increases the weight of the insulated tank so that the insulating panels are pivoted away from the opening to allow sunlight to enter into the container.

During normal daylight hours the temperature within the uninsulated tank remains greater than that in the insulated tank so that the panels remain open during the day. When the sun sets, the temperature within the uninsulated tank drops more quickly than the temperature within the insulated tank. The pressure in the uninsulated tank drops so that a portion of the liquid within the insulated tank flows through the connecting tubing back into the uninsulated tank. The balance of the pivotal insulating panel is again shifted to pivot the panels back down over the glazed opening.

A primary advantage of the present invention is that it operates automatically based upon the presence or absence of sufficient sunlight. It will operate both in winter when temperatures vary from 20° F. at night to 40° F. during the day as well as during the summer when temperatures are much higher. No electricity is needed to operate the insulating panels so that the solar collector can be located remote from any electrical outlet. The system is simple in construction leading to trouble-free operation.

The solar shutter system, being responsive to the amount of sunlight, acts to increase the collection efficiency by automatically opening whenever there is sufficient sunlight present thereby collecting a maximum amount of solar energy; it automatically closes when sufficient sunlight is not present to reduce heat loss from the collection tank. Efficiency is therefore enhanced.

The counterweight pressure tanks, typically filled with Freon, are pendulously mounted to brackets at the ends of one insulating panel. The center of gravity of the tanks thus remain vertically below the pivot point of each tank to aid the smooth operation of the door. It also ensures that the tanks maintain a constant vertical attitude so the fittings, which connect with the tube passing the Freon between the two tanks, remain at lowermost portions of the tanks.

When used with a batch type solar heater, the shutter system preferably uses a pair of panels operably coupled by a tie rod. These panels are less sensitive to wind loads, which can be a problem if a single panel is used. A shock absorber, mounted between one panel and the insulated box, keeps the panels from moving too rapidly or swinging in the wind by providing a damping force against rapid pivoting movement of the panels.

Other features and advantages of the present invention will become apparent from the following description in which the preferred embodiment has been set forth in detail in conjunction with the accompanying drawings.

BRIEF DESCRIPTION OF THE DRAWINGS

FIG. 1 is a perspective view of a solar water heater incorporating a solar shutter system of the present invention.

FIG. 2 is a second perspective view of the heater of FIG. 1.

FIGS. 3A and 3B are schematic illustrations of the effect of sunlight on the levels of liquid in the counterweight pressure tanks.

FIG. 4 is a simplified side view of the heater of FIG. 1 showing the insulating panels covering the glazed opening.

FIGS. 5-6 illustrate alternative embodiments of the present invention.

DETAILED DESCRIPTION OF THE PREFERRED EMBODIMENT

Turning now to FIGS. 1 and 2, a solar water heater system 2 is seen to include a batch type solar water heater 4 to which a solar shutter system of the present invention 6 is attached.

Heater 4 is of generally standard construction and includes an insulated box 8 having a glazed opening 10 and containing a collection tank 12. Tank 12 is connected to a cold water source 14 by an inlet pipe 16. An outlet pipe 18 provides for the discharge of heated water from collection tank 12 and is typically connected to the inlet of a conventional hot water heater H. Sunlight entering the collection tank through opening 10 is absorbed by the darkly painted collection tank 12 so the water entering water heater 18 is at least partially warmed to reduce the amount of additional energy, if any, needed to heat the water.

The present invention is directed to a solar operated shutter embodied by solar shutter system 6 which includes a pair of upper and lower insulating panels 20, 22 pivotally mounted adjacent the upper and lower edges 24, 26 of opening 10.

Upper panel 20 incudes an insulating member 28 on one side of a pivot joint 30 and a pair of outwardly extending arms 32, 33 extending from pivot joint 30 in the opposite direction of panel 20. An uninsulated counterweight pressure tank 34 is penduously suspended from a pair of mounting brackets 36, 37 at an edge 35 of panel 20. Counterweight tank 34 is cylindrical and preferably is painted flat black or some other dark color so that it absorbs much of the sun's radiant energy striking its surface.

At the distal ends 38, 39 of arms 32, 33, extensions 40, 41 pendulously support an insulated counterweight pressure tank 42. Since tank 42 is insulated, the temperature of its interior lags the ambient temperature and is therefore more moderate. The temperature within insulated tank 42 will generally be cooler during the day and warmer during the night compared with uninsulated tank 34. Tanks 34 and 42 are connected by a fluid conduit 44, one end of the conduit connected near the bottoms of tanks 34, 42. The pendulous support insures that the tanks maintain a constant vertical attitude.

The terms insulated and uninsulated are relative terms regarding tanks 42, 34. It may be that a small amount of insulation is desired on tank 34 depending upon the required system response. Part or all of conduit 44 may be insulated as well.

Panels 20, 22 are connected by a tie rod 46. A first end 48 of the tie rod is pivotally connected along a lateral edge 50 of panel 22 and the second end 52 of the tie rod is pivotally connected to an extension 54 which extends from distal end 38 of arm 32. Thus, movement of one of the panels results in a complementary movement of the other panel.

The inner surfaces 56, 58 of panels 20, 22 are covered with reflective material to increase the amount of solar radiation entering through glazed opening 10. A pair of panels are preferred over using a single insulating panel to reduce the wind forces on the panel. To help prevent rapid movement of the panels, a shock absorber 60 is connected at one end to box 8 and at the other end to arm 33. Also connected between box 8 and arm 33 is a counterbalancing spring assembly 62. This spring assembly pushes against arm 33 when the panels are fully opened. Spring assembly 33 aids the movement of panels 20, 22 when they just start to close by helping to overcome the weight of panel 22.

FIGS. 3A and 3B schematically illustrate the distribution of a partially vaporized fluid 66 held within tanks 34, 42 and conduit 44. As sunlight S strikes the outer surface of uninsulated counterweight tank 34, the vapor pressure above fluid 66 within tank 34 increases relative to the vapor pressure above the fluid in tank 42. This forces fluid 66 through conduit 44 and into insulated tank 42. Tank 42, covered with an insulating layer 68, usually remains cooler than tank 34 in the daytime so that the vapor pressure above the fluid within tank 42 is lower than that above the fluid in tank 34. This daytime condition is shown in FIG. 3A and corresponds to the position of shutter system 6 in FIGS. 1 and 2.

In FIGS. 3B and 4 the tanks are shown as they would be at night. In the evening uninsulated tank 34 begins to cool quite rapidly (relative to insulated tank 42) so that the vapor pressure above the fluid therein drops. The relative vapor pressure above the fluid in insulated tanks 42 becomes greater than the vapor pressure in tank 34 and forces fluid from tank 42 through conduit 44 into tank 34; the weight of tank 34 increases while the weight of tank 42 decreases thus causing upper panel 20 to move downwardly against opening 10 after a sufficient quantity of fluid 66 has been transferred. This downward movement also causes lower insulating panel 22 to be pivoted towards opening 10.

When the sun again shines on uninsulated tank 34, the vapor pressure above the fluid in the uninsulated tank rises thus forcing the fluid from tank 34 into tank 42. When a sufficient amount of fluid has been transferred, the shift in weight causes panels 20 and 22 to pivot upwardly uncovering opening 10 to allow the sunlight to once again heat the water within collection tank 12.

So far the solar shutter system has been described in an embodiment used with a batch type solar hot water heater. FIGS. 5 and 6 disclose schematic representations of alternative embodiments of the invention. FIG. 5 discloses a system in which an uninsulated tank 72 is mounted at the end of an insulating panel 74 to cover an opening on a sloping roof 76. An insulated tank 78 is connected via a rope 80 to the panel, the rope passing over a pulley 82. When sunlight heats uninsulated tank 72, fluid within the tank passes from the uninsulated tank to insulated tank 78 causing tank 78 to lower and thus raise panel 74. If desired uninsulated tank 72 can be mounted on roof 76 so that the weight of panel 74 alone causes it to cover the opening in the roof. However, doing so may require about twice the amount of partially vaporized fluid to achieve the same shift in weight.

Another embodiment, shown in FIG. 6, uses a vertically disposed panel 84 mounted adjacent the side of a building B for covering and uncovering an opening O on the side of the building. An uninsulated tank 86 is mounted on panel 84 while an insulated tank 88 is suspended by a rope 90, the rope being connected to panel 84 and passing over a pair of pulleys 92. When sunlight strikes uninsulated tank 86, the fluid within the uninsulated tank is forced into insulated tank 88 through a flexible conduit 94. This shift in weight of the tanks moves insulated tank 88 downwardly causing panel 84 to move upwardly to expose opening O. At night tank 86 cools causing a shift of the fluid to close opening O.

Similarly, a horizontally disposed insulating panel, not shown, could be coupled to insulated and uninsulated tanks for movement depending on the amount of sunlight. Such a system could be useful for horizontal skylights or for moving a cover over a swimming pool.

Other modifications and variation can be made to the disclosed embodiments without departing from the subject of the invention as defined in the following claims.

I claim:

1. A solar collector system comprising:
   an insulated enclosure having a light transmissive surface and housing a fluid container having a highly absorptive surface for collection of radiant energy from sunlight passing through said light transmissive surface;
   a first tank substantially thermally uninsulated and adapted to be exposed to sunlight;
   a second tank including a layer of thermal insulation covering a substantial portion thereof, said second tank movable between an upper level and a lower level;
   tube means fluidly connecting said first and second tanks;
   a partially vaporized fluid contained within said first and second tanks and said tube means;
   a first insulating panel movably mounted adjacent said light transmissive surface between first and second positions, said first position at least partially covering said light transmissive surface and said second position substantially removed from said light transmissive surface; and
   means for operably coupling said second tank and said first panel so that movement of a portion of said partially vaporized fluid between said first and second tanks through said tube means due to differential pressures within said tanks caused by temperature differences between the interiors of said first and second tanks causes said second tank to move between said upper and lower levels thereby moving said first panel between said first and second positions.

2. The shutter system of claim 1 wherein the outside surface of said said first tank has a high absorptivity.

3. The shutter system of claim 1 wherein said first tank is mounted to said first panel.

4. The shutter system of claim 3 wherein said second tank is mounted to said first panel.

5. The shutter system of claim 4 wherein said first panel is pivotally mounted to said enclosure and including a second panel pivotally mounted to said enclosure and coupled to said first panel by tie rod means so that movement of said first panel causes corresponding movement of said second panel.

6. The shutter system of claim 4 further comprising means for pendulously suspending said first and second tanks from said first panel.

7. The shutter system of claim 6 including means for damping the movement of said first panel between said first and second positions.

8. A solar collector comprising:
   an insulated enclosure having a light transmissive surface and housing a fluid container having a highly absorptive surface for collection of radiant energy from sunlight passing through said light transmissive surface;
   an insulating panel pivotally mounted to said enclosure along a pivot edge and sized to cover at least a portion of said surface thereby thermally insulating said surface when in a first position and to expose said surface portion to said sunlight when in a second position;
   a first substantially thermally uninsulated tank, said first tank adapted to be exposed to said sunlight and pendulously mounted to said panel;
   a second tank pendulously mounted to said panel, said first and second tanks on opposite sides of said pivot edge;
   an insulation layer substantially covering said second tank to thermally insulate said second tank;
   tube means fluidly connecting said first and second tanks; and
   a partially vaporized fluid contained within said first and second tanks and said tube means, whereby movement of a portion of said fluid between said first and second tanks due to differential pressures within said tanks resulting from temperature differences within said tanks causes said panel to move between said first and second positions.

9. The heater of claim 8 wherein said panel comprises first and second panel sections pivotally mounted to said enclosure on opposite sides of said surface and joined by tie rod means so that movement of one said panel section correspondingly moves the other said panel section.

10. The heater of claim 9 including means for damping the pivotal movement of said panel.

11. A solar shutter system for use with a solar collector of the type including an enclosure and a glazed opening, the system comprising:
    an insulating panel pivotally mounted to the enclosure along a pivot edge and sized to cover at least a portion of the opening thereby thermally insulating the opening portion when in a first position and to expose the opening portion to sunlight when in a second position;
    a first substantially thermally uninsulated tank, said first tank mounted to said panel and adapted to be exposed to said sunlight;
    a second tank mounted to said panel, said first and second tanks on opposite sides of said pivot edge;
    an insulation layer substantially covering said second tank to thermally insulate said second tank;
    tube means fluidly connecting said first and second tanks; and
    a partially vaporized fluid contained within said first and second tanks and said tube means, whereby movement of a portion of said fluid between said first and second tanks due to differential pressures within said tanks resulting from temperature differences within said tanks causes said panel to move between said first and second positions.

* * * * *